(12) United States Patent
DiMascio et al.

(10) Patent No.: US 7,192,646 B2
(45) Date of Patent: Mar. 20, 2007

(54) HOSE CONSTRUCTION CONTAINING FLUOROELASTOMER COMPOSITION AND FLUOROPLASTIC BARRIER

(75) Inventors: Ramon Joseph DiMascio, Cuyahoga Falls, OH (US); Mervin Victor Pilkington, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 286 days.

(21) Appl. No.: 10/454,171

(22) Filed: Jun. 4, 2003

(65) Prior Publication Data

US 2004/0247811 A1 Dec. 9, 2004

(51) Int. Cl.
B29D 22/00 (2006.01)
B29D 23/00 (2006.01)
B32B 1/08 (2006.01)

(52) U.S. Cl. .................. 428/422; 428/36.9; 428/36.91; 428/421; 138/137; 138/140; 138/141

(58) Field of Classification Search ............... 428/36.9, 428/36.91, 421, 422; 138/137, 140, 141
See application file for complete search history.

(56) References Cited

U.S. PATENT DOCUMENTS

| | | | | |
|---|---|---|---|---|
| 5,280,083 | A | 1/1994 | Forste et al. | 525/369 |
| 5,639,528 | A | 6/1997 | Feit et al. | 428/36.91 |
| 5,641,445 | A * | 6/1997 | Fauble et al. | 264/171.24 |
| 5,855,977 | A | 1/1999 | Fukushi et al. | 428/36.6 |
| 5,941,286 | A | 8/1999 | Fauble et al. | 138/137 |
| 6,261,657 | B1 | 7/2001 | Ainsworth et al. | 428/36.91 |
| 6,303,699 | B1 | 10/2001 | Naraki et al. | 525/326.3 |
| 6,489,420 | B1 | 12/2002 | Duchesne et al. | 526/255 |

FOREIGN PATENT DOCUMENTS

| | | |
|---|---|---|
| EP | 1 160 496 | 12/2001 |
| WO | WO 01/55266 A1 | 8/2001 |
| WO | WO 02/16111 A1 | 2/2002 |
| WO | WO 02/16131 A1 | 2/2002 |
| WO | WO 03/037621 A2 | 5/2003 |

OTHER PUBLICATIONS

Visek, K., Kirk-Othmer Encyclopedia of Chemical Technology, copyright 1992, DOI: 10.1002/0471238961.0601202022091905. a01; posted online Dec. 4, 2000 (2 pages).*
European Search Report.

* cited by examiner

*Primary Examiner*—Michael C. Miggins
(74) *Attorney, Agent, or Firm*—John D. DeLong

(57) ABSTRACT

The present invention relates to a hose comprising: a thermoplastic fluoropolymer barrier layer; and a rubber layer adjacent to the barrier layer, the rubber layer comprising 100 parts by weight of an elastomer comprising FKM fluoroelastomer; from about 1 to about 15 parts by weight, per 100 parts by weight of elastomer, of at least one acid acceptor selected from the group consisting of magnesium oxide, calcium hydroxide, litharge, dibasic lead phosphite, calcium oxide, and zinc oxide; from about 1 to about 6 parts by weight, per 100 parts by weight of elastomer, of at least one diamine curative; and from about 1 to about 10 parts by weight, per 100 parts by weight of elastomer, of at least one of a hydrotalcite or tricalcium aluminate hexahydrate; wherein the weight ratio of the at least one acid acceptor to the at least one hydrotalcite ranges from about 1 to about 5.

17 Claims, 1 Drawing Sheet

HOSE CONSTRUCTION CONTAINING FLUOROELASTOMER COMPOSITION AND FLUOROPLASTIC BARRIER

BACKGROUND OF THE INVENTION

A major proportion of fuel hose presently employed in automobile applications is a multi-layered structure. The innermost tubular layer of the hose is formed of an elastomeric material intended to keep the fluid in the hose. Located between the innermost layer and the outer elastomeric cover is a barrier layer. In other fuel hoses, the barrier layer is the innermost tubular layer (known as a veneer hose), with the elastomeric material being located outside of such barrier layer. Many barrier layers have been used; however, many such compounds used in the barrier do not adhere to the conventional elastomeric material used in the innermost tubular layer. As a result of this problem, those skilled in the art conventionally use a layer between the innermost layer and the barrier layer which is both compatible to the elastomer used in the innermost layer and the barrier layer. In particular, the adhesion between highly impermeable thermoplastic polymer barrier layers and elastomeric innermost layers has been problematic. It is desirable, therefore, to have a hose having excellent adhesion between a highly impermeable thermoplastic polymer barrier layer and an elastomeric layer.

SUMMARY OF THE INVENTION

There is disclosed a hose comprising:
a thermoplastic fluoropolymer barrier layer; and
a rubber layer adjacent to said barrier layer, said rubber layer comprising
100 parts by weight of an elastomer comprising FKM fluoroelastomer;
from about 1 to about 15 parts by weight, per 100 parts by weight of elastomer, of at least one acid acceptor selected from the group consisting of magnesium oxide, calcium hydroxide, litharge, dibasic lead phosphite, calcium oxide, and zinc oxide;
from about 1 to about 6 parts by weight, per 100 parts by weight of elastomer, of at least one diamine curative and
from about 1 to about 10 parts by weight, per 100 parts by weight of elastomer, of at least one of a hydrotalcite or tricalcium aluminate hexahydrate;
wherein the weight ratio of said at least one acid acceptor to said at least one hydrotalcite ranges from about 1 to about 5.

DETAILED DESCRIPTION OF THE INVENTION

Figure 1:
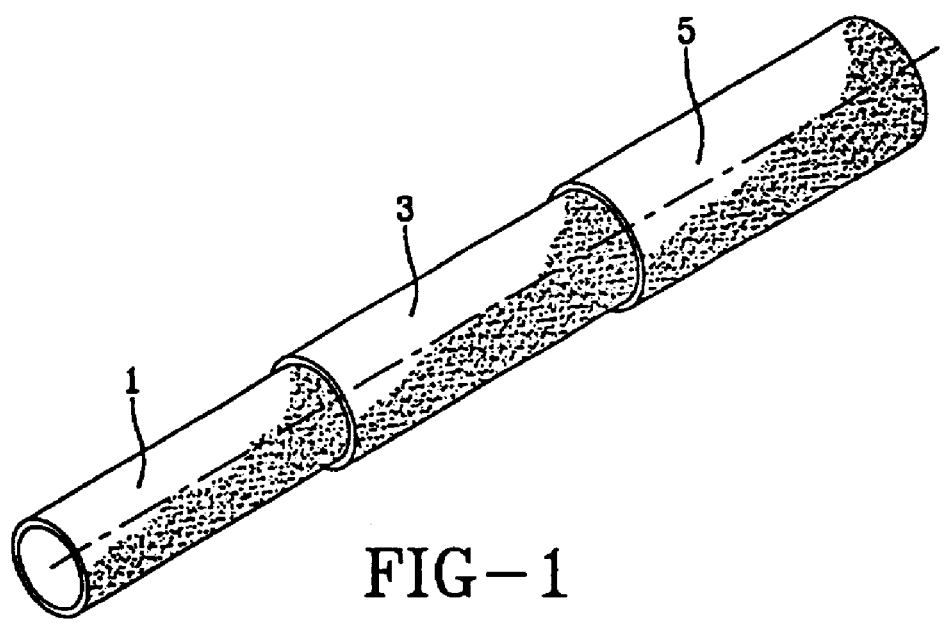
FIG. 1 is a perspective view of a hose according to the invention.

When a hose (20), for example, as shown in FIG. 1 is produced, the inner core layer (1) or tubular core layer of the present invention may be formed from FKM rubber, with barrier layer (3) adhered thereto. An embodiment where the inner core (1) is a barrier layer and the layer (3) is of the FKM composition that is adhered thereto will be described later.

The FKM fluoroelastomers, which can be used according to the invention, have been available for some time. For example, the FLUOREL brand of fluoroelastomers, introduced by the 3M Company of Minnesota in the early 1960's, are suitable for use in this invention. These fluoroelastomers are tetrafluoroethylene (TFE)/hexafluoropropylene(HFP)/vinylidene fluoride(VF2) terpolymer compositions, which are melt processable, providing a useful combination of performance and processing advantages without the need for organic additives. They are characterized by low processing temperature range (100° C. to 175° C.), co-processability with temperature-sensitive substrates, like non-fluorinated plastics, and elastomers, like ECO. They also are essentially amorphous and have the characteristics of elastomers, i.e., they are thermosetting compounds which exhibit a 100% stretch without deformation. Typically, the fluoroelastomers contain about 65–71% fluorine by weight. They also show excellent flexibility/elongation features with low flexural modulus, good flex fatigue life, and avoidance of stress cracking. They evince versatile bondability (hot melt adhesive) and a broad temperature service range.

These fluoroelastomers can have a relatively wide range of monomer ratios. These fluoroelastomers are generally described in U.S. Pat. No. 2,833,752, issued May 5, 1958 and U.S. Pat. No. 5,208,305, issued May 4, 1993, both of which patents are incorporated herein by reference. Generally, the TFE component can be present in the range of 0 to 70 parts by weight, the HFP component can have a range of 20 to 50 parts by weight and the VF2 component can have a range of 20 to 80, based on 100 parts by weight of FKM. In one embodiment, the FKM fluoroelastomer is a fluoroelastomer sold by 3M Company/Dyneon under the designation FE5832X.

Suitable FKM polymers are obtained, for example, by polymerizing a mixture of monomers consisting of 40 mol percent of TFE, 30 mol percent of HFP and 30 mol percent of VF2. This FKM composition is suited to a well-known extrusion process for forming the FKM layer.

The FKM fluoroelastomer is typically compounded with various additives, such as carbon black, curatives, and plasticizers for processability and for conductivity. The FKM fluoroelastomer layer is preferably conductive, as the result of additives such as carbon black. Other typical compounding ingredients include acid acceptors and processing aid such as carnauba wax.

The FKM fluoroelastomer composition includes at least one acid acceptor. Suitable acid acceptors include but are not limited to magnesium oxide, calcium hydroxide, litharge, dibasic lead phosphite, calcium oxide, and zinc oxide. In one embodiment, the acid acceptor includes magnesium oxide. Suitable magnesium oxide includes low to moderate activity magnesium oxides having a BET surface area of up to about 70 m2/gm. Suitable magnesium oxide is available from The C. P. Hall Company as Maglite® Y or Maglite® K.

Acid acceptors are present in the FKM fluoroelastomer composition in a range of from about 5 to about 15 parts by weight of acid acceptor per 100 parts by weight of elastomer, in other words, from 5 to about 15 phr (parts per hundred rubber). In one embodiment, acid acceptors are present in a range of from about 5 to about 10 phr.

The FKM fluoroelastomer composition includes at least one diamine curative. Suitable diamine curatives include, but are not limited to, N,N'-dicinnamylidene-1,6-hexanediamine, hexamethylenediamine carbamate, and 4,4'-methylenebis(cyclohexylamine)carbamate. In one embodiment, the diamine curative includes N,N'-dicinnamylidene-1,6-hexanediamine, and 4,4'-methylenebis(cyclohexylamine)carbamate. Suitable diamine curatives are available from Vanderbilt under the name Diak®.

Diamine curatives are present in the FKM fluoroelastomer composition in a range of from about 1 to about 6 phr. In one embodiment, diamines are present in a range of from about 1 to about 4 phr.

The FKM fluoroelastomer composition includes at least one of a hydrotalcite or tricalcium aluminate hexahydrate, $Ca_3Al_2O.6H_2O$. Hydrotalcites include but are not limited to materials described by the formula $Mg(1-x)Al_x(OH)_2(CO_3)_{x/2}.n\ H_2O$; $0.25<x<0.33$. Synthetic hydrotalcite may include a mixture of various compounds within the given range of x. Synthetic forms of hydrotalcite are available from several sources, including DHT-4A2® and Alcamizer® from Kyowa Chemical Industry Co., Ltd., Sorbacid® 911 from Sud-Chemie AG, Hycite® 713 from Ciba Specialty Chemicals, and Hysafe® 510 from Huber. Tricalcium aluminate hexahydrate is available from Huber as Hysafe® 310.

At least one of a hydrotalcite and tricalcium aluminate hexahydrate may be present in the FKM fluoroelastomer composition in a range of from 1 to about 10 phr.

At least one acid acceptor and at least one of a hydrotalcite and tricalcium alumninate hexahydrate are present in the fluoroelastomer composition in a weight ratio of at least one acid acceptor to at least one of a hydrotalcite and tricalcium alumninate hexahydrate ranging from about 1 to about 5.

The FKM fluoroelastomer composition may include at least one fatty amine. Suitable fatty amines include cocoalkylamines, 1-dodecylamine, 1-hexadecylamine, 1-octadecylamine, oleylamine, soyaalkylamines, tallowalkylamines, hydrogenated tallowalkylamines, dicocoalkylamines, di-n-docecylamine, di-n-hexadecylamine, di-n-octadecylamine, di(tallowalkyl)amines, di(hydrogenated tallowalkyl)amines, cocoalkyldimethylamines, dimethyl-n-octylamine, dimethyl-n-decylamine, dimethyl-n-dodecylamine, dimethyl-n-tetradecylamine, dimethyl-n-hexadecylamine, dimethyl-n-octadecylamine, dimethyloleylamines, di-n-decylmethylamine, dicocoalkylmethylamines, dihydrogenated tallowalkylmethylamines, tri-n-octylamine, tri-n-dodecylamine, and tri-n-hexadecylamine. In one embodiment, the fatty amine includes di(hydrogenated tallowalkyl) amines of formula $R_2NH$ wherein R is $C_{16}H_{33}$ to $C_{18}H_{37}$. Suitable fatty amines are available from Vanderbilt as Vanax® 882B and from Akzo Nobel as Armeen® 2HT.

Fatty amines may be present in the FKM fluoroelastomer composition in a range of from about 0.5 to about 6 phr. In one embodiment, fatty amines are present in a range of from about 1 to about 3 phr.

The FKM fluoroelastomer composition may optionally include carbon black. Carbon blacks suitable for use in the FKM fluoroelastomer composition include reinforcing blacks and electrically conductive blacks. In one embodiment, the FKM fluoroelastomer composition includes a low acid type reinforcing carbon black such as N990 or the like. In one embodiment, the FKM fluoroelastomer composition includes an electrically conductive carbon black such as Vulcan XC-72 or the like. In one embodiment, the FKM fluoroelastomer composition includes both a low acid-type carbon black and an electrically conductive carbon black.

Carbon black may be present in the FKM fluoroelastomer composition in a range of from 0 to about 30 phr.

The FKM fluoroelastomer composition may optionally include at least one plasticizer. Plasticizers suitable for use in the FKM fluoroelastomer composition include but are not limited to sebacates, caprate-caprylates, and the like. In one embodiment, the FKM fluoroelastomer composition includes a secabacate plasticizer such as dibutyl sebacate or the like. Suitable dibutyl sebacate is available as Plasthall DBS.

Plasticizer may be present in the FKM fluoroelastomer composition in a range of from 0 to about 10 phr.

The mixing of the FKM rubber composition can be accomplished by methods known to those having skill in the rubber mixing art. For example, the ingredients may be mixed in one stage but are typically mixed in at least two stages, namely at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage (s).

Curing of the FKM rubber composition is generally carried out at conventional temperatures ranging from about 160° C. to 190° C. Preferably, the curing is conducted at temperatures ranging from about 170° C. to 180° C., and a pressure of at least 75 psig. Post cure may include a gradual reduction of pressure and temperature. Curing may be done using any of the methods as are known in the art, such as with a steam autoclave, heated press, or the like.

Referring to FIG. 1, the inner core layer (1) may be of the above-described FKM fluoroelastomer composition with the barrier layer (3) adhered thereto.

In accordance with another embodiment, the barrier layer (1) may be the inner core with a FKM rubber layer (3) adhered thereto.

The FKM layer may be formed by extrusion methods known to those skilled in the art. The thickness of this layer, whether the inner core (1) or layer (3), is important as excessively thin wall thicknesses or excessively thick wall thicknesses present flexibility or kinking problems or coupling compatibility problems of the final hose composite. It is believed that the inside diameter of the inner core (1), whether made from the FKM or barrier layer, should range from 3 mm to 100 mm. Preferably, the inside diameter of the inner core will range from 4 mm to 75 mm. When the inner core is made from the FKM, the wall thicknesses of the inner core (1) should range from 0.1 mm to 8.0 mm, with a range of from 0.5 mm to 4.0 mm being preferred. When the inner core is made from the barrier layer compound, the wall thicknesses of the inner core (1) should range from 0.02 to 0.76 mm.

One advantage of the present invention is that the layer of FKM fluoroelastomer composition may be directly adhered to the barrier layer used in the present invention. Accordingly, the superior permeation resistance of the barrier layer (3) may be utilized without sacrifice of adhesion between the FKM layer and the barrier layer.

The barrier layer (1) or (3) used in the present invention is derived from a fluorothermoplastic as will be described more fully later herein. The thickness of this barrier layer (3) is important, as excessively thin wall thicknesses or excessively thick wall thicknesses present flexibility or kinking problems or desired barrier properties. Generally speaking, the thickness of the barrier layer (3) will range from about 0.1 mm to about 1 mm. Alternatively, the thickness of the barrier layer (3) will range from about 0.15 mm to 0.5 mm.

Suitable fluorothermoplastics for use in the barrier layer include fluorothermoplastic quadpolymers, fluorothermoplastic terpolymers (THV), PTFE, and FEP, poly(ethyleneco-tetrafluoroethylene) (ETFE), poly(tetrafluoroethylene-co-propylene) (TFEP), poly(chlorotrifluoroethylene-co-ethylene) (ECTFE), and the terpolymer poly(ethylene-co-tetrafluoroethylene-co-hexafluoropropylene) (E/TFE/HFP). In one embodiment, the fluorothermoplastic in the barrier layer includes fluorothermoplastic quadpolymers or fluorothermoplastic terpolymers (THV).

Suitable thermoplastic quadpolymers are disclosed in U.S. Pat. No. 6,489,420, fully incorporated herein by reference. As disclosed therein, suitable thermoplastic quadpolymers are derived from i) tetrafluoroethylene, (ii) vinylidene fluoride, (iii) at least one ethylenically unsaturated monomer of the formula CF2=CFRf where Rf is a perfluoroalkyl or a perfluoroalkoxy of 1 to 8 carbon atoms, and (iv) a perfluorovinyl ether of the formula CF2=CF—(OCF2 CF(Rf))a OR'f where Rf is as described in (iii), R'f is a perfluoroaliphatic, preferably a perfluoroalkyl or a perfluoroalkoxy, of 1 to 8, preferably 1 to 3, carbon atoms, and a has a value of 0 to 3. In one embodiment, suitable thermoplastic quadpolymers comprise (i) 40 to 80 weight percent (alternatively 45 to 76 weight percent) tetrafluoroethylene, (ii) 10 to 30 weight percent (alternatively 12 to 25 weight percent) vinylidene fluoride, (iii) 5 to 40 weight percent (alternatively from 10 to 30 weight percent) of a comonomer of the formula CF2=CFRf, and (iv) 0.1 to 15 weight percent (alternatively 1 to 10 weight percent) of the perfluorovinyl ether of the formula CF2=CF—(OCF2 CF(Rf))a OR'f.

In an alternative embodiment, the thermoplastic quadpolymer contains interpolymerized units derived from TFE, VDF, HFP and the perfluorovinyl ether wherein the value of "a" is 0, 1 or 2.

In an alternative embodiment, the thermoplastic quadpolymer contains interpolymerized units derived from TFE, VDF, HFP and the perfluorovinyl ether is of the formulas PPVE1 or PPVE2:

    PPVE1

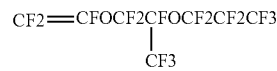    PPVE2

In one embodiment, the thermoplastic quadpolymer which may be used to form the barrier layer (3) of the hose of the present invention are commercially available from the Dyneon Company under the commercial designation THV X 815G.

Also suitable for use in the barrier layer of thermoplastic quadpolymer is a thermoplastic terpolymer derived from tetrafluoroethylene, hexafluoropropylene and vinylidene fluoride. Suitable thermoplastic terpolymer of tetrafluoroethylene, hexafluoropropylene and vinylidene fluoride may include about 30–75 weight percent tetrafluoroethylene, about 5–40 weight percent hexafluoropropylene and about 5–55 weight percent vinylidene fluoride, with 100 weight percent of the monomer weight of the terpolymer made up from the combination of tetrafluoroethylene, hexafluoropropylene and vinylidene fluoride. Suitable thermoplastic terpolymers have a melting point range of about 75° C. to about 275° C. In one embodiment, suitable thermoplastic terpolymers of tetrafluoroethylene, vinylidene fluoride, and hexafluoropropylene are available from Dyneon LLC and Dyneon GmbH as THV-200, 300, 400, 500, and 600 series.

Typically the hose will include an outer cover (5). This outer cover (5) may be made from an elastomeric material or reinforcement. Examples of reinforcement include spiraled yarn, knitted yarn and braided yarn. Yarns of polyester, nylon, rayon and aramid may be used. When an elastomeric cover is desired, the cover (5) may be extruded over the underlying layer 3, or, as discussed below, various other optional layers. The elastomers which may be used to form the cover (5) for the hose (20) of the present invention include those known to those skilled in the art such as chlorosulfonated polyethylene, chlorinated polyethylene, acrylonitrile-butadiene rubber/PVC blends, epichlorohydrin, EPDM, chloroprene, EVA, ethylene acrylic elastomer AEM, and EVM. The thickness of the elastomeric cover (5) is obviously depends upon the desired properties of the hose (20) and the elastomer that is used. Generally speaking, the thickness of the elastomeric cover (5) will range from about 0.1 mm to about 10 mm, with a range of from 0.5 mm to being 2.5 mm being preferred.

Figure 2:
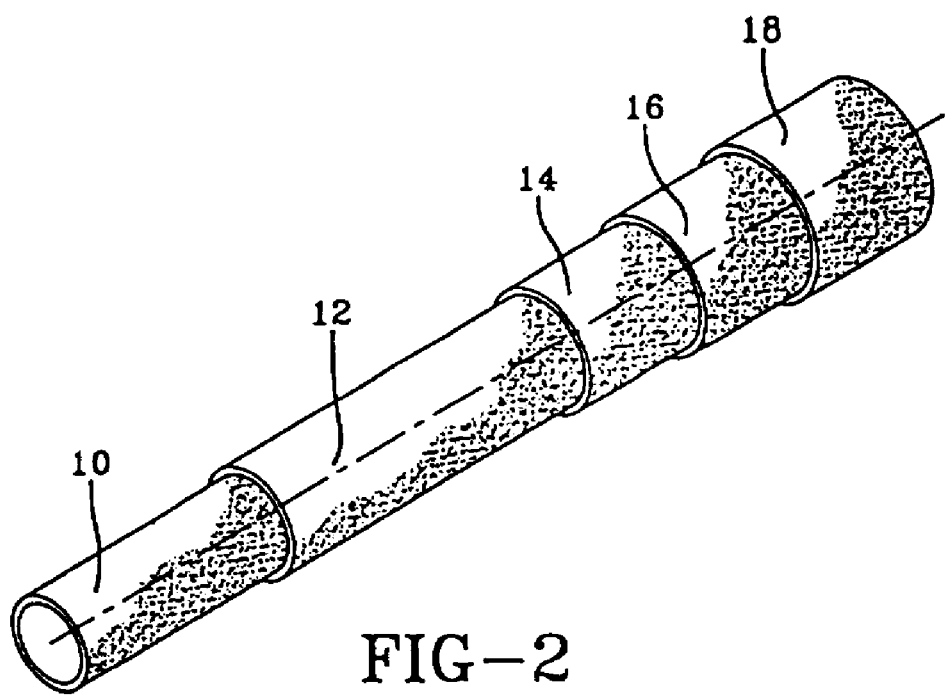
FIG. 2 is a perspective view of a hose according to the invention.

Whereas the basic layers have been discussed above as essential to the present invention, the hose of the present invention may have optional features. For example, when a hose (30), as shown in FIG. 2, is produced having the inner FKM core (10), and barrier layer (12), dispersed on the outside of the barrier layer (12) may be a first layer (14) of another polymer. Such polymer may be of the same composition as the inner core (10). In another embodiment, the polymer which is used in this first layer (14), which interfaces the barrier layer (12), may be epichlorohydrin. The thickness of this first layer (14) which interfaces the barrier layer (12) may range depending upon the polymer selected. Generally speaking, the thickness of this layer will range of from about 0.25 mm to about 1.5 mm with a range of from about 0.50 mm to about 1.0 mm being preferred.

Another optional feature of the present invention is reinforcement (16) which may be added on top of the first layer (14) which interfaces with the barrier layer (12). Such reinforcement (16) is known to those skilled in the art and may consist of spiraled, knitted or braided yarn. Such reinforcements are typically derived from polyester, nylon, rayon or aramid cords. The reinforcement (16) is preferably spirally wound about the first layer under sufficient tension to improve the strength of the hose structure. The reinforcement layer (16) is preferably spirally wrapped at angles such that the flexing of the hose (30) will not result in collapse or kinking. An angle such as from 0 to 89.9° with respect to the centerline of the hose may be used. Most preferably, a neutral angle of 54° 73' or below is used for the spiral wraps.

In accordance with one embodiment, the inner core (10) functions as a barrier layer comprised of the above-described terpolymer, the next layer (12) is made of the FKM fluoroelastomer composition, the next layer (14) is omitted, with reinforcement (16) being directly against the rubber layer (12) followed by an outer cover (18).

As mentioned above, the elastomeric cover (18) is the outside layer.

The FKM layer may be formed by extrusion methods known to those skilled in the art. The thickness of this layer whether the innermost layer 1 or next layer 3 is important as excessively thin wall thicknesses or excessively thick wall thicknesses present flexibility or kinking problems or coupling compatibility problems of the final hose composite. It is believed that the inside diameter of the innermost layer (1) whether made from the FKM or barrier layer should range from 3 mm to 100 mm. Preferably, the inside diameter of the innermost layer will range from 4 mm to 75 mm. When the innermost layer is made from the FKM, the wall thicknesses of the innermost layer (1) should range from 0.1 mm to 8 mm. Alternatively, the wall thickness of the innermost layer (1) will range from 0.5 mm to 4 mm. When the innermost layer is made from the barrier layer compound, the wall thicknesses of the innermost layer (1) should range from 0.1 to 1 mm.

The following example is provided to illustrate the instant invention and are not intended to limit the same.

EXAMPLE

FKM fluoroelastomer compositions were prepared and evaluated for adhesion to a thermoplastic fluoropolymer suitable for use as a hose barrier layer. Recipes used in the FKM compositions are shown in Table 1, with all amounts given in parts by weight. Samples 1–4 were controls, and Sample 5–8 represent the current invention. Samples of each FKM composition were fabricated with a THV 815G thermoplastic fluoropolymer layer and cured at 340° F. with a bladder pressure of 100 psig for 25 minutes on a heated press followed by a gradual cool down over 10 minutes to give samples suitable for adhesion testing. The adhesion samples were then tested for adhesion using an Instron tester per ASTM D 413-98. Results of adhesion tests are given in Table 2.

TABLE 1

| Sample | control 1 | control 2 | control 3 | control 4 | 5 | 6 | 7 | 8 |
|---|---|---|---|---|---|---|---|---|
| FKM[1] | 100 | 100 | 100 | 100 | 100 | 100 | 100 | 100 |
| carbon black[2] | 12 | 12 | 12 | 12 | 12 | 12 | 12 | 12 |
| carbon black[3] | 10 | 10 | 10 | 10 | 10 | 10 | 10 | 10 |
| acid acceptor[4] | 10 | 10 | 10 | 15 | 10 | 10 | 10 | 10 |
| plasticizer[5] | 0 | 0 | 0 | 5 | 5 | 5 | 5 | 5 |
| hydrotalcite[6] | 0 | 0 | 0 | 0 | 5 | 5 | 5 | 5 |
| amine curative[7] | 2.5 | 4 | 6 | 4 | 4 | 4 | 2 | 2 |
| amine curative[8] | 0 | 0 | 0 | 0 | 0 | 0 | 1.1 | 1.1 |
| fatty amine[9] | 0 | 0 | 0 | 0 | 0 | 1 | 0 | 1 |

[1]FE-5832X, obtained from Dyneon
[2]N990 Carbon black
[3]Vulcan XC-72 Carbon black
[4]Maglite Y, medium activity magnesium oxide, obtained from C. P. Hall
[5]Plasthall DBS, dibutyl sebacate, obtained from C. P. Hall
[6]Hysafe 510, obtained from Huber
[7]DIAK #3, (n,n-dicinnamylidene-1,6-hexanediamine), obtained from R. T. Vanderbilt
[8]DIAK #4, 4,4'-methylenebis(cyclohexylamine)carbamate, obtained from R. T. Vanderbilt
[9]Vanax 882-B, believed to include about 90% di(hydrogenated tallowalkyl) amines of formula R2NH wherein R is C16H33 to C18H37, obtained from R. T. Vanderbilt

TABLE 2

Adhesion to THV 815G[1]

| Sample | 1 | 2 | 3 | 4 | 5 | 6 | 7 | 8 |
|---|---|---|---|---|---|---|---|---|
| Failure Mode[2] | interface | interface | mixed | mixed | stock | stock | stock | stock |

[1]Adhesion of FKM composition to THV 815G, believed to be a thermoplastic quadpolymer derived from TFE, VDF, HFP and a perfluorovinyl ether.
[2]Failure Modes: interface = failure at FKM/THV interface with no stock tear; stock = 100% stock tear in FKM; mixed = mixed interfacial/stock failure

TABLE 3

ODR at 173° C.

| Sample | 1 | 2 | 3 | 4 | 5 | 6 | 7 | 8 |
|---|---|---|---|---|---|---|---|---|
| Min torque | 7.9 | 6.7 | 6 | 5.6 | 4.6 | 3.8 | 5.5 | 5.4 |
| TRIS/1 | 3.36 | 3.36 | 3.44 | 4.48 | 4 | 4.16 | 2 | 2.32 |
| $T_{25}$ | 4.4 | 5.92 | 7.6 | 8.8 | 7.68 | 7.6 | 3.44 | 4.24 |
| $S_{25}$ | 9.8 | 10.1 | 11.1 | 9.3 | 9.3 | 8.2 | 10.4 | 10.1 |
| $T_{90}$ | 29.36 | 28.24 | 26.96 | 34.96 | 25.2 | 22 | 16.96 | 18.4 |
| $S_{90}$ | 15.1 | 19.1 | 24.8 | 19 | 21.6 | 20.2 | 23.6 | 22.5 |
| Rate | 0.21 | 0.41 | 0.7 | 0.37 | 0.7 | 0.83 | 0.98 | 0.88 |
| AMT | 8 | 13.8 | 20.8 | 14.9 | 18.9 | 18.2 | 20.2 | 19 |
| $T_{50}$ | 8.88 | 10.4 | 12.56 | 14.72 | 11.84 | 11.44 | 6 | 7.36 |
| $T_{75}$ | 17.52 | 18.24 | 18.8 | 24.32 | 17.84 | 16.4 | 10.56 | 12.32 |
| Max torque | 15.9 | 20.5 | 26.8 | 20.5 | 23.5 | 22 | 25.7 | 24.4 |

Samples 1 through 4 are considered to be controls, and are typical of FKM formulations as are known in the art. As seen in Table 2, Samples 1 through 4 showed interfacial or mixed interfacial/stock failure, indicating poor adhesion of the prior art FKM compositions to THV 815G. Samples 5 through 8 are illustrative of the present invention. Samples 5–8 illustrate that addition of hydrotalcite to the FKM rubber results in FKM stock tear, indicating good adhesion at the FKM/THV 815G interface. Samples 6 and 8 further illustrate that the addition of a fatty amine along with the hydrotalcite results in reduced minimum torque as compared to samples 5 and 7, indicating better wetting at the interface and a more processable rubber. Samples 6 and 8 also illustrate that the addition of the fatty amine moderates the reaction in the FKM such that the rubber does not overcure, as indicated by the maximum torque values. This indicates that the hoses having good adhesion will not be overcured leading to a brittle hose.

What is claimed is:

1. A hose comprising:
   a thermoplastic fluoropolymer barrier layer comprising a thermoplastic quadpolymer derived from (i) tetrafluoroethylene, (ii) vinylidene fluoride, (iii) at least one ethylenically unsaturated monomer of the formula $CF_2=CFR_f$ where $R_f$ is a perfluoroalkyl or a perfluoroalkoxy of 1 to 8 carbon atoms, and (iv) a perfluorovinyl ether of the formula $CF_2=CF—(OCF_2CF(R_f))_a OR'_f$ where $R_f$ is as described in (iii), $R'_f$ is a perfluoroaliphatic, a perfluoroalkyl or a perfluoroalkoxy, of 1 to 8 carbon atoms, and a has a value of 0 to 3; and
   a rubber layer adjacent to said barrier layer, said rubber layer comprising 100 parts by weight of an elastomer comprising FKM which is a tetrafluoroethylene/ hexafluoropropylene/vinylidene fluoride terpolymer composition;
   from about 5 to about 15 parts by weight, per 100 parts by weight of elastomer, of at least one acid acceptor selected from the group consisting of magnesium oxide, calcium hydroxide, litharge, dibasic lead phosphite, calcium oxide, and zinc oxide;
   from about 1 to about 6 parts by weight, per 100 parts by weight of elastomer, of at least one diamine curative; and
   from about 1 to about 10 parts by weight, per 100 parts by weight of elastomer, of at least one of a hydrotalcite or tricalcium aluminate hexahydrate;

wherein the weight ratio of said at least one acid acceptor to said at least one of a hydrotalcite or tricalcium aluminate hexahydrate ranges from about 1:1 to about 5:1; and from about 0.5 to about 6 parts by weight, per 100 parts by weight of elastomer, of at least one fatty amine selected from the group consisting of cocoalkylamines, 1-dodecylamine, 1-hexadecylamine, 1-octadecylamine, oleylamine, soyaalkylamines, tallowalkylamines, hydrogenated tallowalkylamines, dicocoalkylamines, di-n-docecylamine, di-n-hexadecylamine, di-n-octadecylamine, di(tallowalkyl)amines, di(hydrogenated tallowalkyl)amines, cocoalkyldimethylamines, dimethyl-n-octylamine, dimethyl-n-decylamine, dimethyl-n-dodecylamine, dimethyl-n-tetradecylamine, dimethyl-n-hexadecylamine, dimethyl-n-octadecylamine, dimethyloleylamines, di-n-decylmethylamine, dicocoalkylmethylamines, dihydrogenated tallowalkylmethylamines, tri-n-octylamine, tri-n-dodecylamine, and tri-n-hexadecylamine.

2. The hose of claim 1, wherein said at least one fatty amine is di(hydrogenated tallowalkyl)amines of formula $R_2NH$ wherein R is $C_{16}H_{33}$ to $C_{18}H_{37}$.

3. The hose of claim 1, wherein said rubber layer comprises from about 1 to about 3 phr of said at least one fatty amine.

4. The hose of claim 1, wherein said at least one acid acceptor is magnesium oxide.

5. The hose of claim 1, wherein said rubber layer comprises from about 5 to about 15 phr of said at least one acid acceptor.

6. The hose of claim 1, wherein said rubber layer further comprises from about 0 to about 10 phr of a dibutyl sebacate plasticizer.

7. The hose of claim 1, wherein said rubber layer further comprises from 0 to about 30 phr of carbon black.

8. The hose of claim 1, wherein said rubber layer comprises from 2 to about 8 phr of at least one of a hydrotalcite and tricalcium aluminate hexahydrate.

9. The hose of claim 1, wherein said at least one hydrotalcite includes hydrotalcites having the formula $Mg_{(1-x)}Al_x(OH)_2(CO_3)_{x/2} \cdot n\, H_2O$; $0.25 < x < 0.33$.

10. The hose of claim 1, wherein said rubber layer comprises from 1 to about 4 phr of said at least one diamine curative.

11. The hose of claim 1, wherein the thermoplastic quadpolymer is derived from tetrafluoroethylene, hexafluoropropylene, vinylidene fluoride, and a perfluorovinyl ether of one of the following formulas:

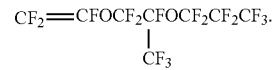

12. The hose of claim 1, wherein the thermoplastic quadpolymer is derived from (i) 40 to 80 weight percent tetrafluoroethylene, (ii) 10 to 30 weight percent vinylidene fluoride, (iii) 5 to 40 weight percent of a comonomer of the formula $CF_2=CFR_f$, and (iv) 0.1 to 15 weight percent of the perfluorovinyl ether of the formula $CF_2=CF-(OCF_2CF(R_f))_a OR'_f$.

13. The hose of claim 1, wherein said FKM fluoroelastomer comprises about 0 to 70 parts by weight tetrafluoroethylene, about 20 to 50 parts by weight hexafluoropropylene and about 20 to 80 parts by weight vinylidene fluoride, based on 100 parts by weight of FKM.

14. The hose of claim 1, wherein said barrier layer is the innermost layer of the hose.

15. The hose of claim 1, wherein said rubber layer is the innermost layer of the hose.

16. The hose of claim 1, wherein said at least one diamine curative is selected from N,N'-dicinnamylidene-1,6-hexanediamine and 4,4'-methylenebis(cyclohexylamine)carbamate.

17. The hose of claim 16, wherein the at least one fatty amine is di(hydrogenated tallowalkyl)amines of formula $R_2NH$ wherein R is $C_{16}H_{33}$ to $C_{18}H_{37}$.

* * * * *